US011153280B1

(12) United States Patent
Walwadkar (10) Patent No.: US 11,153,280 B1
(45) Date of Patent: Oct. 19, 2021

(54) TRUE TRANSPARENT PROXY TO SUPPORT MULTIPLE HTTP/S WEB APPLICATIONS ON SAME IP AND PORT ON A DATA COMMUNICATION NETWORK

(71) Applicant: Fortinet, Inc., Sunnyvale, CA (US)

(72) Inventor: Radhesh Ramakant Walwadkar, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/916,092

(22) Filed: Jun. 29, 2020

(51) Int. Cl.
*G06F 21/00* (2013.01)
*H04L 29/06* (2006.01)
*H04L 29/08* (2006.01)

(52) U.S. Cl.
CPC ...... *H04L 63/0281* (2013.01); *H04L 63/0236* (2013.01); *H04L 63/166* (2013.01); *H04L 67/02* (2013.01)

(58) Field of Classification Search
None
See application file for complete search history.

(56) References Cited

U.S. PATENT DOCUMENTS

| 2018/0046811 | A1* | 2/2018 | Andriani | H04L 63/1425 |
| 2018/0288062 | A1* | 10/2018 | Goyal | H04L 63/1408 |
| 2019/0014146 | A1* | 1/2019 | Reddy | H04L 9/0861 |
| 2019/0334869 | A1* | 10/2019 | Grant | H04L 61/3025 |
| 2020/0053060 | A1* | 2/2020 | Moritomo | H04L 9/3268 |
| 2020/0404028 | A1* | 12/2020 | Wang | H04M 7/006 |

* cited by examiner

*Primary Examiner* — Quang N Nguyen
(74) *Attorney, Agent, or Firm* — Law Office of Dorian Cartwright; Dorian Cartwright (57) ABSTRACT

A true transparent proxy for a web application firewall is provided. Granular network security policies are applied on a per web application basis using unique SSL inspection certificates for web applications sharing a common IP address.

4 Claims, 6 Drawing Sheets

TRUE TRANSPARENT PROXY TO SUPPORT MULTIPLE HTTP/S WEB APPLICATIONS ON SAME IP AND PORT ON A DATA COMMUNICATION NETWORK

FIELD OF THE INVENTION

The invention relates generally to computer networking, and more specifically, to providing true transparent proxy for supporting multiple HTTP/S web applications on the same IP and port one a data communication network.

BACKGROUND

A website secured with SSL (Secure Socket Layer) moves to HTTPS (Hypertext Transfer Protocol Secure) from HTTP (Hypertext Transfer Protocol). SSL is a standard technology for keeping an Internet connection secure and safeguarding any sensitive data that is being sent between two systems. Devices attempting to communicate with the origin server will reference this file to obtain a public key to verify the server identity while the private key is kept secret. Besides the public key, the SSL certificate also indicates a domain name, issue, and other data. Clients open a TLS (Transport Layer Security) connection with the server from the SSL certificate. This process prevents cyber criminals from reading and modifying any information transferred, such passwords and account numbers. Also, hackers are prevented from spoofing clients with fake versions of web sites by verifying that a client is talking to the correct sever that actually owns the domain.

Figure 3A:
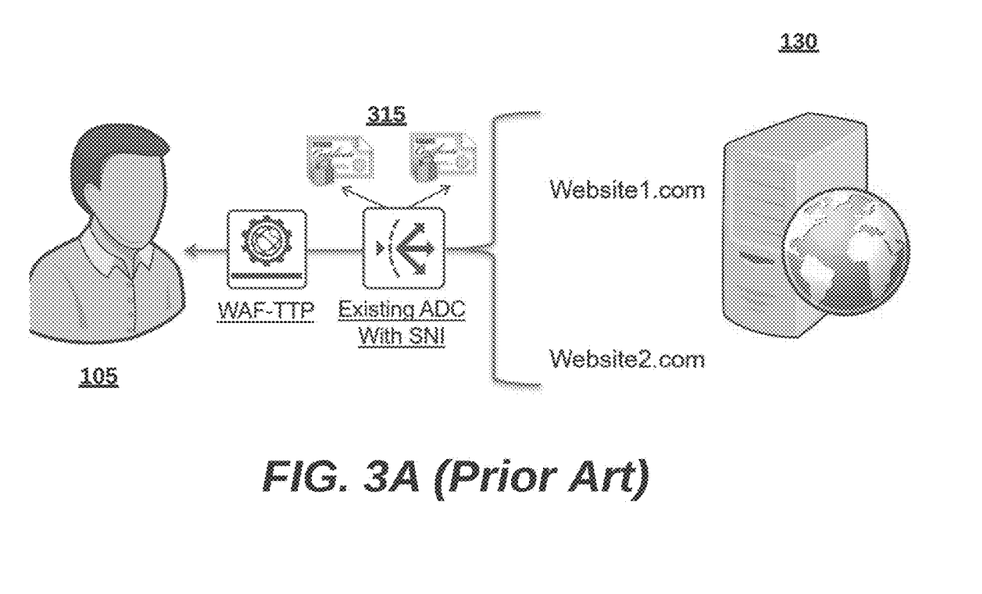
FIGS. 3A and 3B are block diagrams illustrating SSL inspection certificates under the prior art and under the disclosure herein, according to one embodiment.

One problem arises in a newer type of web software architecture wherein several applications share the same IP address, as illustrated in the prior art of FIG. 3A. More specifically, conventional security only verifies a single SSL certificate for the server IP address, but there is no provision to define a Real Server on basis of FQDN (Fully Qualified Domain Name), or an absolute domain name, in TTP mode and assign a separate certificate.

Generally, FQDN is a domain name including the top-level domain and the root zone (or the domain name and the hostname) to specify its exact location in the tree hierarchy of the Domain Name System. Furthermore, firewall policies are separated using protected hostname, however, there is no mechanism to assign separate SSL certificates for protected hostnames. Consequently, all web applications may be treated the same without any granular control on network security policies under conventional transparent proxy.

What is needed is a robust technique for true transparent proxy for supporting multiple HTTP/S web applications on the same IP and port of a data communication network for improved control over security policies. Each web application can have a separate SSL certificate for granular control of network security polices.

SUMMARY

To meet the above-described needs, methods, computer program products, and systems with true transparent proxy for supporting multiple HTTP/S web applications on the same IP and port one a data communication network.

In one embodiment, publishing, by a processor of the WAF, each of a plurality of real servers on a fully qualified domain name (FQDN), associated with a COMMON domain name Internet protocol (IP) address and each FQDN protecting a web application running on the FQDN;

assigning and storing, by a memory element of the WAF, a secure socket layer (SSL) inspection certificate to each of the FQDN real servers;

receiving, at a network communication interface of the AP coupled to the data communication network, network traffic at a single IP address on the data communication network, the network traffic having multiple web site destinations for web-based applications;

responsive to the received network traffic, retrieving an SSL inspection certificate for each of the FQDN real servers associated with the multiple web site destinations; and forwarding traffic securely to the web site destination Advantageously, control over individual security policies of web application sharing a common IP is improved. As a result, network performance and user experience on web apps is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for providing true transparent proxy for supporting multiple HTTP/S web applications on the same IP and port one a data communication network.

Figure 1:
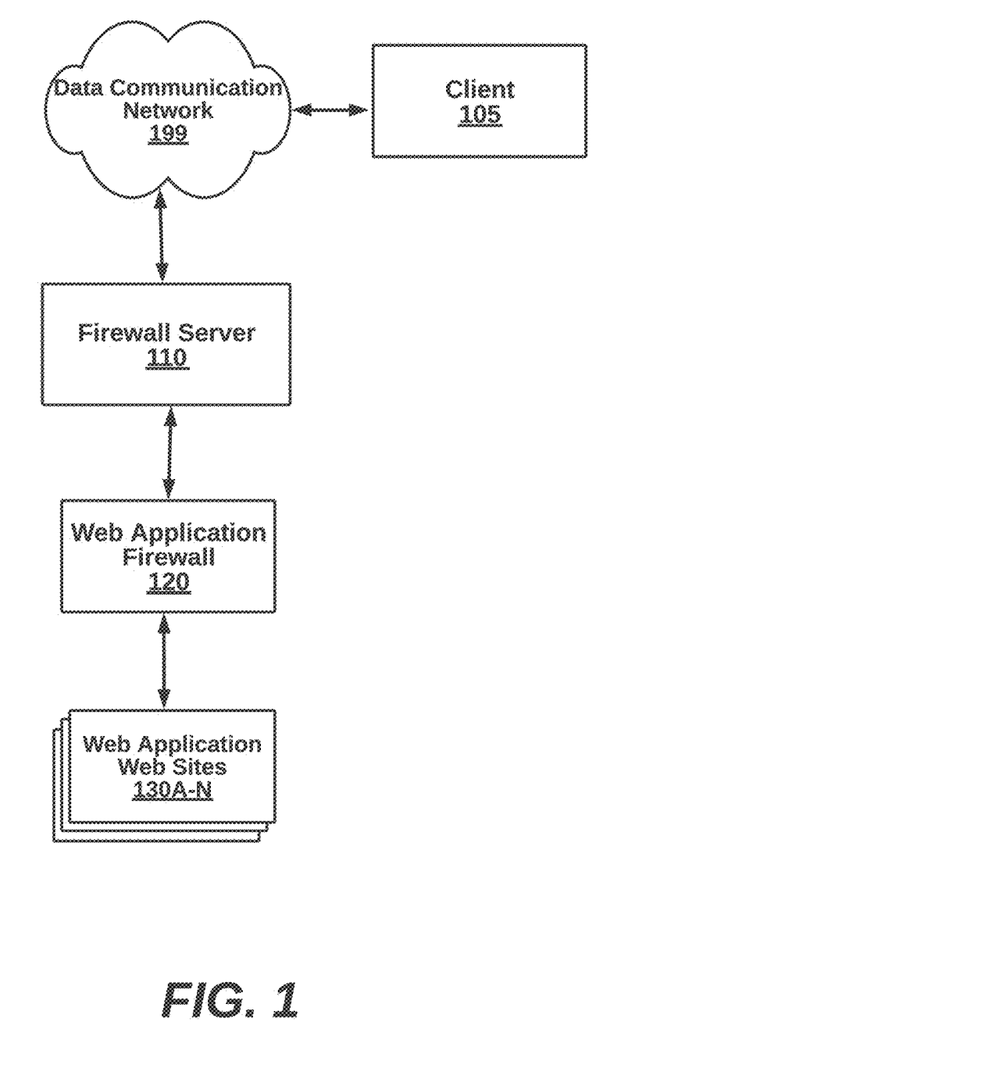
FIG. 1 is a high-level block diagram illustrating a system to provide true transparent proxy for supporting multiple HTTP/S web applications on the same IP and port one a data communication network, according to one embodiment.
Figure 2:
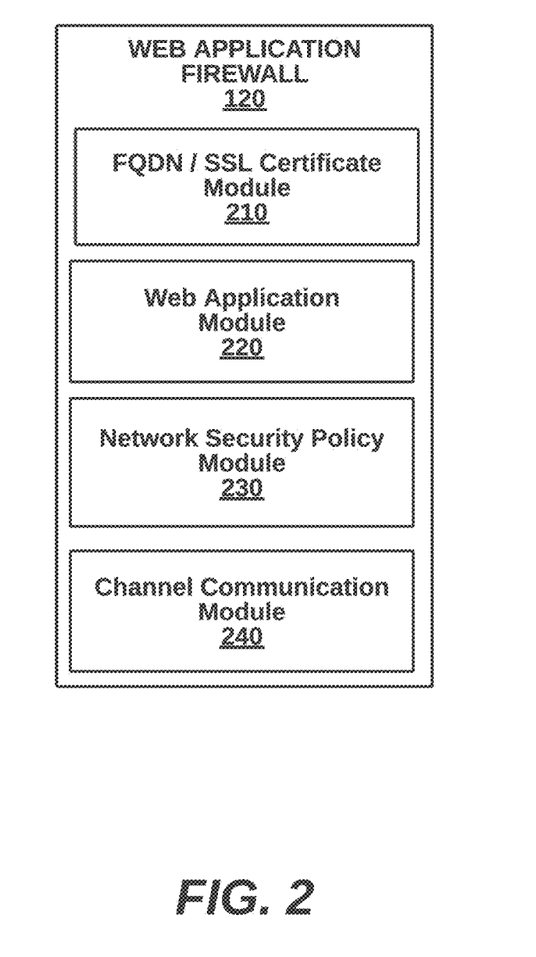
FIG. 2 is a more detailed block diagram illustrating a web application firewall of the system of FIG. 1, according to one embodiment.
Figure 3B:
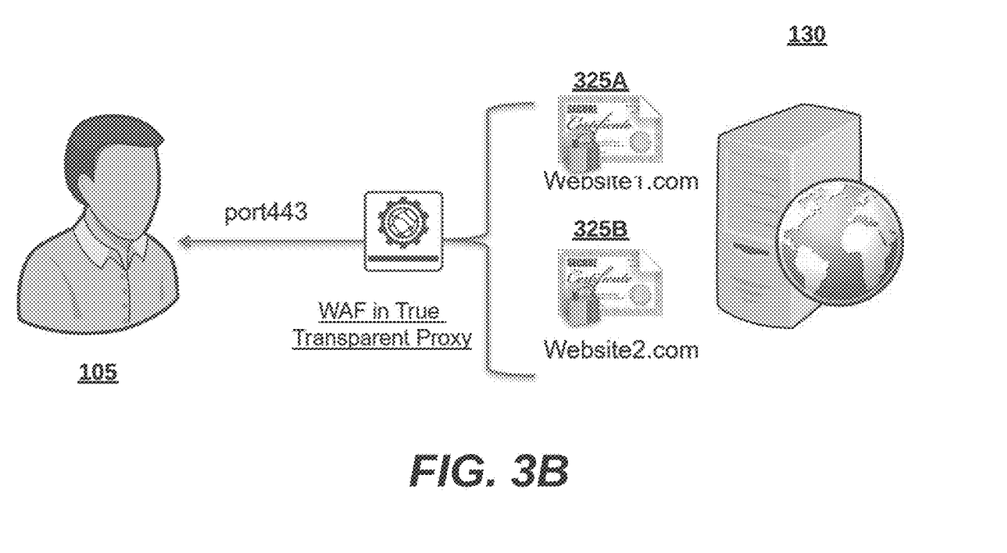

True Transparent Proxy Systems (FIGS. 1-3)

FIG. 1 is a high-level block diagram illustrating an AI system for managing service provider agreements at local Wi-Fi networks, according to one embodiment. The system 100 comprises a firewall server 110, a web application firewall 120, web application web sites 130A-N, and client 105. The components can be coupled to a network 199, such as the Internet, a local network or a cellular network, through any suitable wired (e.g., Ethernet) or wireless (e.g., Wi-Fi or 4G) medium, or hybrid combination of network types. In a preferred embodiment, the firewall server 110 is communicatively coupled to the data communication network 199, and downstream is communicatively coupled to the web application firewall 120 which is, in turn, communicatively coupled to web application web sites 130A-N. Other embodiments of communication channels for system 100 are possible. Additional network components can also be part of the system 100, such as additional controllers (e.g., an SDN, or software-defined networking, controller), additional access points, firewalls, virus scanners, routers, switches, application servers, databases, and the like. An embodiment of system 100 is resident on Amazon Web Services (AWS) or some other storage network.

The WAF 120 provides SSL inspection certificates at a FQDN level. In one implementation, a table is maintained to store SSL inspection certificates in association with web applications. Network administrators can configure SSL inspection certificates through a user interface or dashboard.

More generally, the WAF 120 is a per application, layer 7 firewall policy that enhances a main firewall for the IP as a whole. The WAF 120 helps protect web applications or APIs (Application Programming Interfaces) against common web exploits that may affect availability, compromise security, or consume excessive resources. In one embodiment, the WAF operates in coordination with a load balancer and/or a gateway (e.g., an API gateway).

Figure 6:
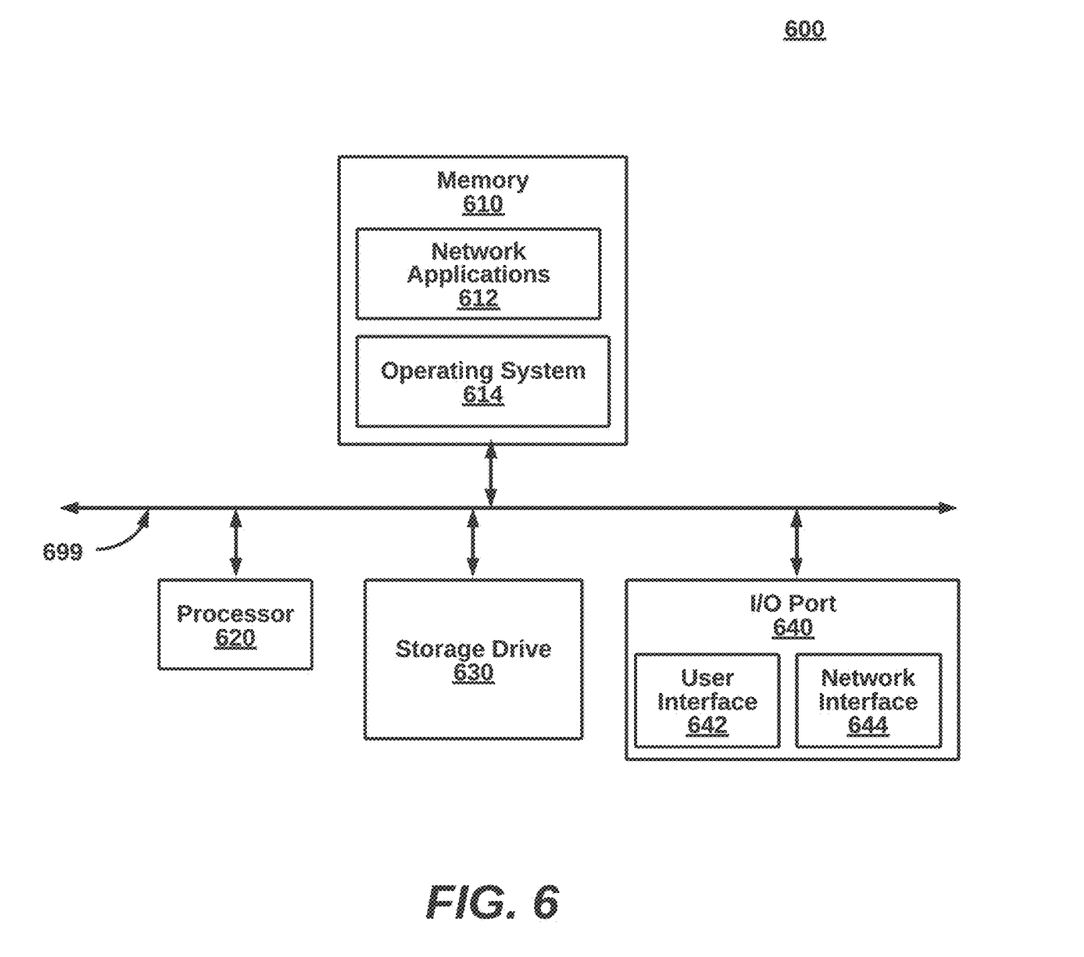
FIG. 6 is a block diagram illustrating an exemplary computing device, according to one embodiment.

The client (or station) 105 can be implemented as a personal computer, a laptop computer, a tablet computer, a smart phone, a mobile computing device, a server, a cloud-based device, a virtual device, an Internet appliance, or any of the computing devices described herein (see e.g., FIG. 6). No special client is needed for techniques described herein, although other aspects of the network may require downloads to the stations 105. The stations 105 connect to an access point for access to a LAN or external networks using an RF (radio frequency) antenna and network software complying with, for example, IEEE 802.11.

FIG. 2 is a more detailed block diagram illustrating the web application firewall 120 of the system 100, according to one embodiment. The web application firewall 120 comprises a FQDN/SSL certificate module 210, a web applications module module 220, a network security policy module 230, and a channel communication module 240. The components can be implemented in hardware, software, or a combination of both. The access point 100 can include various other components for conventional operation, such as transceivers, network protocol modules, network policy modules, and the like.

The FQDN/SSL certificate module 210 manages a list of FQDN registrations and a corresponding list of specific SSL certificates for web applications running on the hostname. In more detail, each web application is protected with a specific network security policy rather than a general policy applied to all of the web applications.

The web applications module 220 manages back-end connections with web servers hosting web applications sharing a common IP address. New or updated web applications can register with the web applications module 220 for access to clients across a data communication network. Different web applications can use different APIs. The web applications module 220 can also manage sessions, and can store locations of web applications for forwarding data packets.

The network security policy module 230 manages a database of policies for each the web applications. The network security policy module 230, in one embodiment, stores a list of FQDN network locations, each in association with an SSL inspection certificate.

The channel communication module 240 generally groups any hardware and/or software necessary for a particular channel, such as Ethernet, Bluetooth, Wi-Fi, 3G, or the like. For example, transceivers and antennae, Ethernet connectors, USB connectors, are all lower level components that transport higher level information.

Figure 4A:
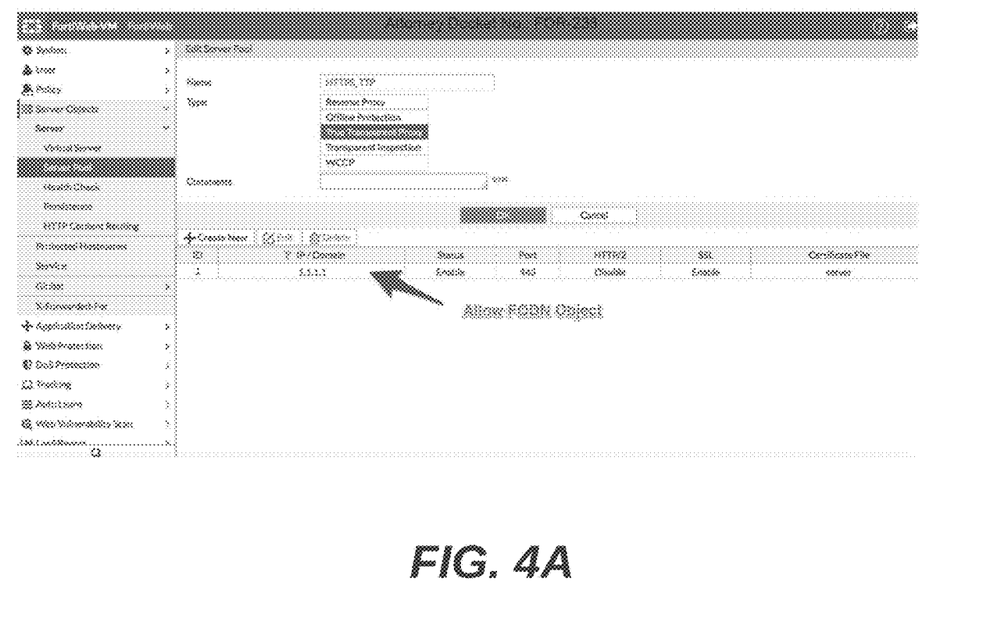
FIGS. 4A and 4B are screenshots of user interfaces showing configurations for true transparent proxy, according to an embodiment.
Figure 4B:
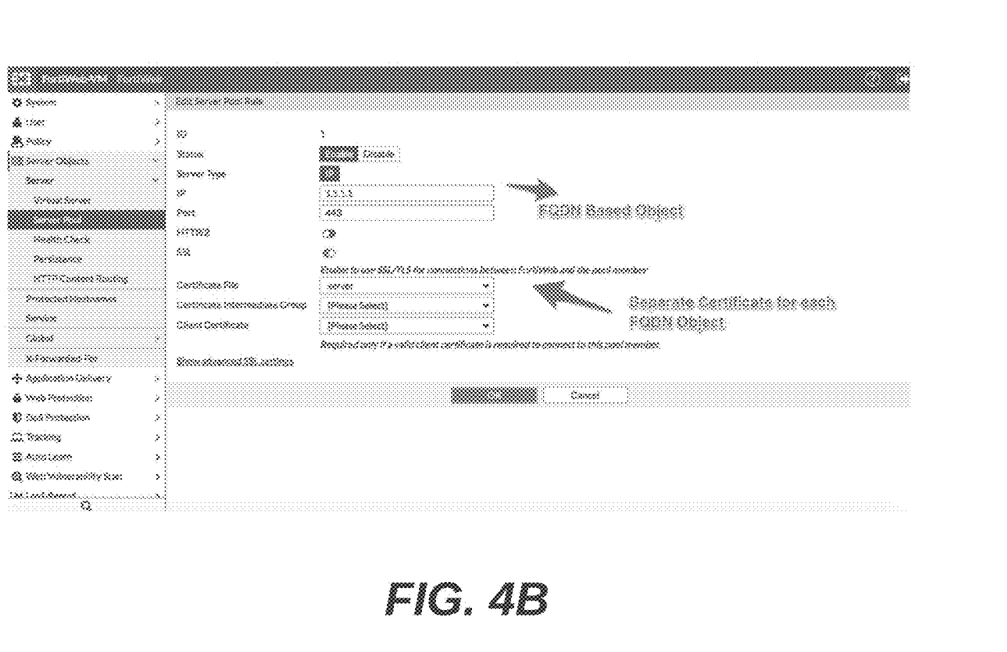

FIG. 3A shows a prior art technique issuing the same SSL certificate for different web applications using the same IP address. By contrast, FIG. 3B shows techniques of the present disclosure issuing a different SSL inspection certificate for different web applications using the same IP address. The screenshots of FIGS. 4A and 4B are just one example user interface that demonstrates one way to configure the new features. Once configured, web applications are able to be treated uniquely on a per web application basis.

Figure 5:
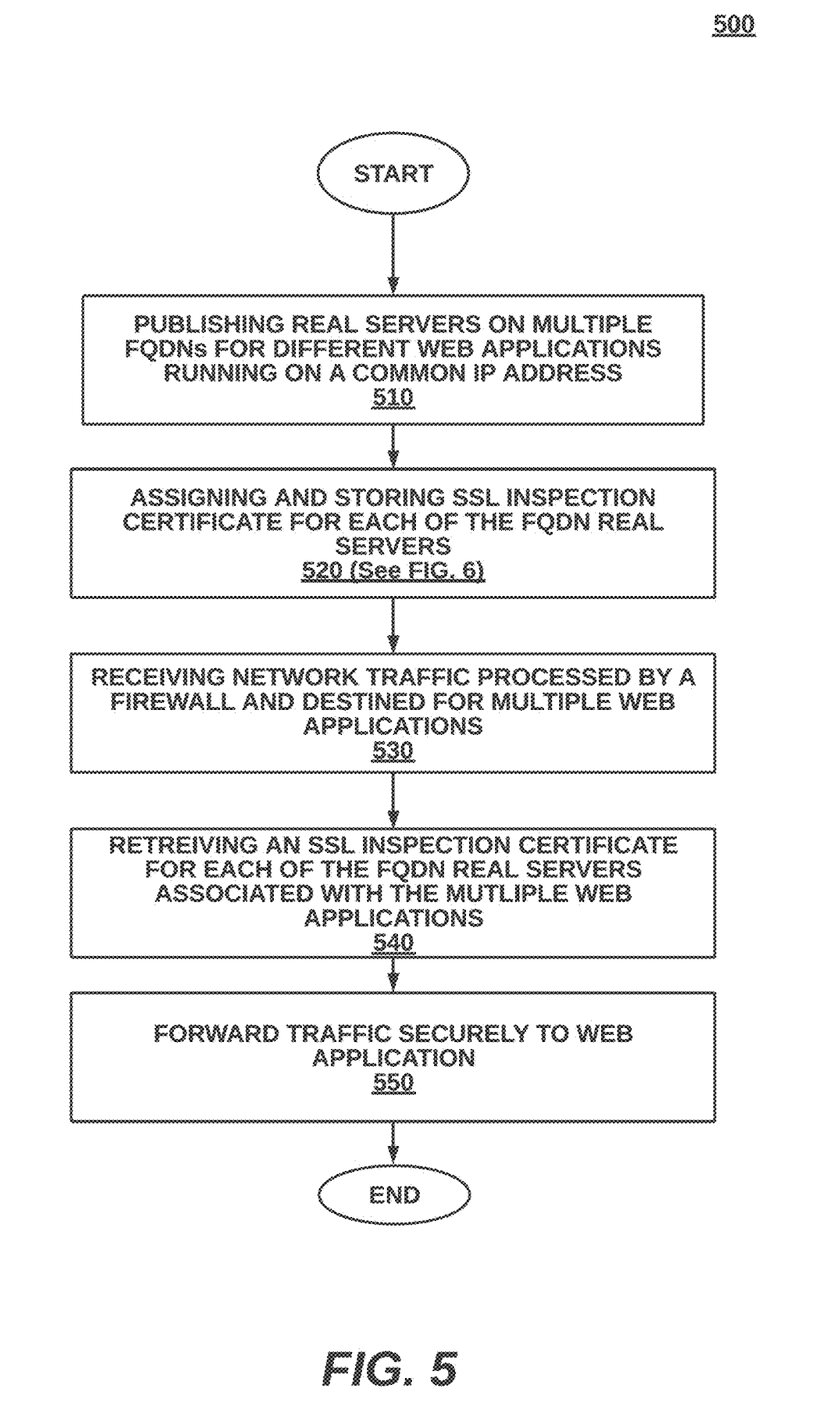
FIG. 5 is a high-level flow diagram illustrating a method for providing true transparent proxy for supporting multiple HTTP/S web applications on the same IP and port one a data communication network, according to one embodiment.

Methods for True Transparent Proxy (FIG. 5)

FIG. 5 is a high-level flow diagram illustrating a method for provide true transparent proxy for supporting multiple HTTP/S web applications on the same IP and port one a data communication network, according to one embodiment. The method 500 can be implemented, for example, in the WAF 120. The WAF coordinates with the firewall 110 in one case.

Real servers are published on multiple FQDNs for different web applications running on a common IP address (step 510). SSL inspection certificates are assigned and stored for each of the FQDN real servers, or each web application (step 520). Network traffic processed by a firewall is received, being destined for multiple web applications of the same IP address (step 530). An SSL inspection certificate is retrieved when the corresponding web application is called up by a client (step 540). Network traffic is securely forwarded to web applications using appropriate APIs.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the WAF, the firewall and the client. Additionally, the computing device 8700 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 750. Communication can be digital and/or analog, and use any suitable protocol.

The memory 710 further comprises network applications 812 and an operating system 714. The network applications 720 can include the modules of network applications or APs as illustrated in FIG. 2. Other network applications can include 712 a web browser, a mobile application, an application that uses networking, a remote application executing locally, a network protocol application, a network management application, a network routing application, or the like.

The operating system 714 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 820 can be disposed on silicon or any other suitable material. The processor 720 can receive and execute instructions and data stored in the memory 710 or the hard drive 830.

The storage device 730 can be any non-volatile type of storage such as a magnetic disc, EEPROM, Flash, or the like. The storage device 730 stores code and data for applications.

The I/O port 740 further comprises a user interface 842 and a network interface 744. The user interface 842 can output to a display device and receive input from, for example, a keyboard. The network interface 744 connects to a medium such as Ethernet or Wi-Fi for data input and output. In one embodiment, the network interface 744 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a web application firewall (WAF) of a data communication network, at least partially implemented in hardware and coupled to a data communication network, for providing true transparent proxy to multiple web sites, the method comprising:
    publishing, by a processor of the WAF, each of a plurality of real servers on a fully qualified domain name (FQDN), associated with a COMMON domain name Internet protocol (IP) address and each FQDN protecting a web-based application running on the FQDN;
    assigning and storing, by a memory element of the WAF, a secure socket layer (SSL) inspection certificate to each of the FQDN real servers;
    receiving, at a network communication interface of an access point (AP) coupled to the data communication network, network traffic at a single IP address on the data communication network, the network traffic having multiple web site destinations for web-based applications;
    responsive to the received network traffic, retrieving an SSL inspection certificate for each of the FQDN real servers associated with the multiple web site destinations; and
    forwarding the network traffic securely to the web site destinations;
    wherein each SSL inspection certificate has a separate network security policy corresponding to a specific web-based application;
    wherein the received network traffic is sourced from a firewall between the WAF and the data communication network and destined to the plurality of web-based applications.

2. The method of claim 1, wherein the network traffic uses the HTTPS (hypertext protocol secure) standard.

3. A non-transitory computer-readable medium storing instructions that, when executed by a processor, perform a computer-implemented method in a web application firewall (WAF) of a data communication network and coupled to a wireless network, for providing true transparent proxy to multiple web sites, the method comprising:
    publishing, by a processor of the WAF, each of a plurality of real servers on a fully qualified domain name (FQDN), associated with a domain name Internet protocol (IP) address and each FQDN protecting a web-based application running on the FQDN;
    assigning and storing, by a memory element of the WAF a secure socket layer (SSL) inspection certificate to each of the FQDN real servers;
    receiving, at a network communication interface of an access point (AP) coupled to the data communication network, network traffic at a single IP address on the data communication network, the network traffic having multiple web site destinations for web-based applications;
    responsive to the received network traffic, retrieving an SSL inspection certificate for each of the FQDN real servers associated with the multiple web site destinations; and
    forwarding the network traffic securely to the web site destinations;
    wherein each SSL inspection certificate has a separate network security policy corresponding to a specific web-based application;

wherein the received network traffic is sourced from a firewall between the WAF and the data communication network and destined to the plurality of web-based applications.

4. A web application firewall (WAF) system of a data communication network, at least partially implemented in hardware and coupled to a data communication network, for providing true transparent proxy to multiple web sites, the system comprising:

a secure socket layer (SSL) module to publish each of a plurality of real servers on a fully qualified domain name (FQDN), associated with a domain name Internet protocol (IP) address and each FQDN protecting a web-based application running on the FQDN;

a memory element of the WAF system to assign and store a secure socket layer (SSL) inspection certificate to each of the FQDN real servers;

a network communication interface of the WAF system, coupled to the data communication network, to receive network traffic at a single IP address on the data communication network, the network traffic having multiple web site destinations for web-based applications; and the SSL module to retrieve an SSL inspection certificate for each of the FQDN real servers associated with the multiple web site destinations, wherein the network communication interface forwards the network traffic securely to the web site destinations;

wherein each SSL inspection certificate has a separate network security policy corresponding to a specific web-based application;

wherein the received network traffic is sourced from a firewall between the WAF and the data communication network and destined to the plurality of web-based applications.

* * * * *